United States Patent [19]
Holmes

[11] Patent Number: 5,939,167
[45] Date of Patent: Aug. 17, 1999

[54] APPARATUS AND METHOD FOR CLEANING A GOLF BALL

[76] Inventor: Rick C Holmes, 31023 N. 44th Pl., Cave Creek, Ariz. 85331

[21] Appl. No.: 08/880,135

[22] Filed: Jun. 20, 1997

[51] Int. Cl.$^6$ ...................................................... A47K 7/04
[52] U.S. Cl. ......................... 428/122; 15/210.1; 428/192
[58] Field of Search ................................. 428/122, 304.4, 428/192; 15/210.1, 214

[56] References Cited

U.S. PATENT DOCUMENTS

| | | | |
|---|---|---|---|
| 2,709,293 | 5/1955 | Schwaderer, Jr. et al. | 428/198 X |
| 4,403,366 | 9/1983 | Lucke | 428/100 X |
| 4,664,959 | 5/1987 | Dagenais et al. | 428/76 X |
| 4,868,025 | 9/1989 | Strzelewicz | 428/304.4 X |
| 4,876,135 | 10/1989 | McIntosh | 428/304.4 X |
| 4,961,982 | 10/1990 | Taylor | 4278/304.4 X |

Primary Examiner—Henry F. Epstein
Attorney, Agent, or Firm—Tod R. Nissle, P.C.

[57] ABSTRACT

A laminate includes a water resistant layer and a water absorbent layer. The laminate is sized to be folded to seal the water resistant layer and to be concealed on the person.

2 Claims, 1 Drawing Sheet

APPARATUS AND METHOD FOR CLEANING A GOLF BALL

This invention relates to a method and apparatus for cleaning a golf ball.

More particularly, the invention relates to apparatus which can be readily concealed and transported on the person and subsequently be taken out and utilized to clean a golf ball.

In another respect, the invention relates to apparatus which can, while wet, be carried in a pocket in a garment worn on the person without transferring water from the apparatus to the garment.

In a further respect, the invention relates to apparatus which can while wet, be reduced in size by folding and which can, by undertaking such folding, be sealed to prevent the escape of water from the apparatus.

A variety of apparatus for cleaning golf balls are well known in the art.

First, a golf course often is equipped with at least one cylindrical housing fixedly mounted on a post which is anchored in the ground at a selected location on the golf course. The cylindrical housing includes a handle which can be turned manually. An opening is formed in the top of the housing. A golf ball is cleaned by dropping the ball into the opening and turning the handle. Turning the handle rotates a cylindrical brush which is mounted inside the cylindrical housing.

Second, a golfer often attaches a towel to the side of his or her golf bag and uses the towel to wipe the golf ball being used by the golfer.

Third, a golfer can utilize a pliable pouch or bag which has a rigid collar, which is partially filled with water and which includes bristles and strands of scrubbing material inside the bag. A golf ball is cleaned by dropping the ball in the bag and manipulating the bag to move the bristles over the ball.

Fourth, a brush or a towel provided with brush bristles can be attached to a golfer's bag. The brush is, with or without water, utilized to remove debris from a golf ball.

While each of the foregoing prior art apparatus is meritorious, each has disadvantages, namely, prior art apparatus can not be carried on the person when dampened with water and/or can not readily prevent the evaporation of moisture from the apparatus.

Accordingly, it would be highly desirable to provide an improved apparatus for cleaning golf ball which can be carried on the person and which prevents the evaporation of water when the apparatus is not being utilized.

Therefore, it is a principal object of the invention to provide an improved method and apparatus for cleaning a golf ball.

Another object of the instant invention is to provide an improved golf ball cleaning apparatus which can be carried in a pocket of a garment worn by a golfer.

A further object of the invention is to provide an improved golf ball cleaning apparatus which includes water and which prevents water from bleeding from the apparatus into a user's garment when the apparatus is carried on the person.

Still another object of the invention is to provide an improved golf ball cleaning apparatus which includes a fabric surface area that is exposed to the ambient air during cleaning of a golf ball and that can be sealed to slow the evaporation of moisture when the cleaning apparatus is in transport or in storage in the pocket of a golfer.

These and other, further and more specific objects and advantages of the invention will be apparent to those skilled in the art from the following detailed description thereof, taken in conjunction with the drawings, in which:

Briefly, in accordance with the invention, I provide an improved panel laminate for cleaning a golf ball. The panel laminate includes a first pliable water resistant layer having a peripheral edge; a second pliable water absorbent layer contiguous to the first layer and having a peripheral edge co-terminating with the peripheral edge of the first pliable water resistant layer; and, a water resistant bead covering the co-terminating peripheral edges. The first and second layers each have an area in the range of nine to one-hundred square inches.

In another embodiment of the invention, I provide a method for cleaning a golf ball. The method includes the step of providing a panel laminate including a first pliable water resistant layer having a peripheral edge; a second pliable water absorbent layer contiguous with the first layer and having a peripheral edge; and a water resistant bead covering said peripheral edge of said water absorbent layer. The first and second layers are shaped and dimensioned such that the laminate is foldable into a reduced size which seals the second layer, which can be carried in the pocket of a garment worn by a user, and which prevents the second layer from contacting the pocket. The method also includes the steps of dampening the second layer with water; folding the laminate into the reduced size; when the user is at a first location, placing the laminate in the pocket; when the user is at a second location, removing the laminate from the pocket, unfolding the laminate, and rubbing the dampened second layer over the golf ball to clean the golf ball.

In a further embodiment of the invention, I provide a panel laminate for cleaning a golf ball. The panel laminate includes a first pliable water resistant layer having a peripheral edge; a second pliable water absorbent layer contiguous with the first layer and having a peripheral edge co-terminating with the peripheral edge of said first pliable water resistant layer; and, a water resistant bead covering the co-terminating peripheral edges. The first and second layers are shaped and dimensioned such that when the laminate is folded in half twice, the second water absorbent layer is sealed without contacting said first layer; the peripheral edges generally lie in a common plane; and, the laminate is sized to be carried on the person concealed in a garment pocket.

Figure 1:
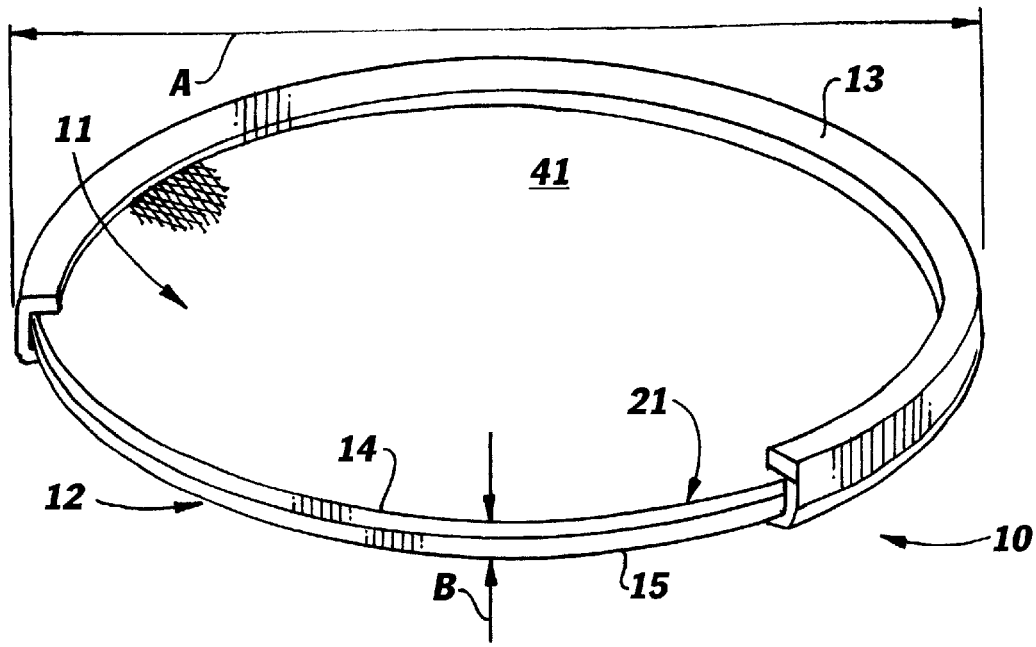
FIG. 1 is a top perspective view illustrating a golf ball cleaning apparatus constructed in accordance with the principles of the invention.

Turning now to the drawings which depict the presently preferred embodiments of the invention for the purpose of describing the operation thereof and not by way of limitation of the scope of the invention, and in which like reference characters refer to corresponding elements throughout the several views, FIG. 1 illustrates a golf ball cleaning apparatus 10 constructed in accordance with the principles of the invention. The shape and dimension of apparatus 10 can vary as desired. However, in FIG. 1, apparatus 10 includes a circular layer 11 fabricated from a water resistant material like, for example, a polymer or other hydrophobic material, a water repellant fabric, or any other material which generally initially resists for at least four hours the absorption of water. Processes and chemicals for treating fabric such that the fabric repels water or slows the absorption of water into the fabric are well known and will not be detailed herein. Circular layer 12 is fabricated from a water absorbent fabric or material like, for example, cotton cloth or terry cloth. Fabrics made from materials like nylon thread can be water absorbent, even though the individual fabric threads are hydrophobic. Layers 11 and 12 ordinarily are affixed to one another with an adhesive or stitching, but need not be.

The peripheral edges 14 and 15 of layers 11 and 12, respectively, preferably, but not necessarily, co-terminate and are covered by a bead 13 fabricated from a water resistant material. The water resistant material used to fabricate bead 13 can comprise a polymer or other hydrophobic material, can comprise a water repellant fabric, or can comprise any material which generally initially resists for at least four hours the absorption of water by the material. A fabric or material resists the absorption of water if it prevents water contacting one side of the material from seeping or passing through the material to the other side of the material. Although not required, it is preferred that bead 13 be fabricated from a polymer which tends to stick or adhere to itself when pressed together, and which can be readily pulled apart when apparatus 10 is unfolded. When portions of bead 13 stick to one another, the sealing of water in layer 15 is facilitated when apparatus 10 is folded. Bead 13 is affixed to peripheral edge 21 and at least covers edge 15 of water absorbent layer 12. While any means can be utilized to affix bead 13, stitching or an adhesive ordinarily are utilized.

The width or diameter, indicated by arrows A, of each circular layer 11, 12 can vary as desired, but preferably has a magnitude which results in the area of each side of layer 11 being in the range of nine square inches to one hundred square inches. In the event layers 11, 12 are not circular but are some other shape, it is still preferred that the area of each side of a layer 11, 12 be in the range of nine square inches to one hundred square inches. When the area is in excess of one hundred square inches, folding the apparatus 10 to a size which will fit in the pocket of a garment can be impractical—the apparatus begins to have a size approaching that of a towel, and towels ordinarily do not meet the objectives of the invention.

The thickness, indicated by arrows B, of the peripheral edge 21 of apparatus 10 is preferably in the range of about one-sixteenth to one-quarter of an inch. A thickness in excess of one-quarter of an inch becomes difficult to fold. A thickness of less than about one-sixteenth of an inch can make retention of any appreciable quantity of water difficult.

Figure 2:
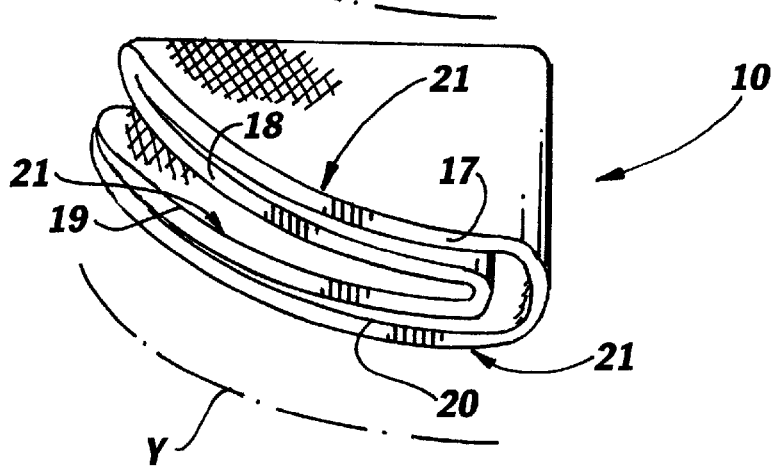
FIG. 2 is a top perspective view illustrating the golf ball cleaning apparatus of FIG. 1 after it is sealingly folded for transport in the pocket of a golfer.

Layers 11 and 12 and bead 13 must be pliable to permit apparatus 10 to be folded. Further, although not necessary, it is preferred that apparatus 10 be susceptible to being folded in half at least twice successively so that the size of apparatus 10 can be reduced to facilitate its storage in a pocket, particularly in a pocket on a garment worn by a golfer. FIG. 2 illustrates apparatus 10 of FIG. 1 after apparatus 10 has been folded in half twice successively. In FIG. 2, however, bead 13 has been omitted for the sake of clarity. The length of each arcuate "quarter edge" portion 17, 18, 19, 20 illustrated in FIG. 2 equals about one-fourth of the total circumferential length of circular peripheral edge 21 of apparatus 10. Edge 21 includes edges 14 and 15. In FIG. 2, edges portions 17 to 20 each lie in a common imaginary arcuate plane which passes through and extends between parallel axis lines X and Y. Lines X and Y are parallel to each of portions 17 to 20 and each have a curvature substantially identical to the curvature of each of portions 17 to 20.

Figure 3:
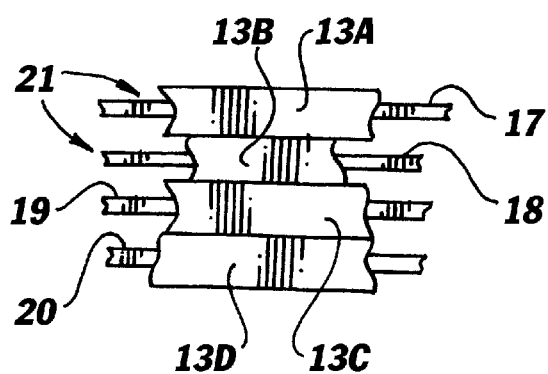
FIG. 3 is a side elevation view illustrating the sealing contact of the border of the cleaning apparatus of FIG. 1 after the apparatus is folded into the configuration illustrated in FIG. 2.

FIG. 3 illustrates the quarter edge portions 17, 18, 19, 20 of FIG. 2 along with portions 13A to 13D of the bead 13 which normally circumscribes edge 21. Portion 13A covers edge portion 17. Portion 13B covers edge portion 18. Portion 13C covers edge portion 19. Portion 13D covers edge portion 20. Portions 13A to 13D are interconnected and collectively comprise bead 13. Portions 17 to 20 are interconnected and collectively comprise edge 21. As shown in FIG. 3, when apparatus 10 is folded, portions 13A and 13B preferably sealingly contact one another and slow or prevent the evaporation of water from layer 15. Similarly, portions 13B—13C and 13C—13D contact one another to slow or prevent the evaporation of water from layer 15. Each portion 13A to 13D lies in the above-noted arcuate imaginary common plane which passes through axes X and Y. In order to obtain contact between bead portions 13A and 13D such that portions 13A to 13D each contact an adjacent portion 13A to 13D, the shape of apparatus 10 must permit each segment 13A to 13D of peripheral bead 13 to lie in a common plane when apparatus 10 is folded, particularly each time apparatus 10 is folded in half. A circular or elliptical apparatus meets this criteria because circular or elliptical apparatus can be folded in half twice successively to produce segments of peripheral edge 13 which each lie in a common arcuate plane. Similarly, square apparatus 10 meets this criteria because it can be folded in half twice successively to produce segments of the peripheral edge of the square apparatus which each lie in a common flat plane. An apparatus 10 having the shape of an equilateral triangle does not meet this criteria because the apparatus 10 cannot be folded in half twice successively such that each segment of the peripheral edge of the triangle lies in a common plane. Similar, an apparatus 10 having the shape of a pentagon also does not meet the specified criteria.

When apparatus 10 is folded, maintaining the resulting segments of the peripheral bead or edge of the apparatus in a common plane is important because it insures that a portion of moist layer 12 will not contact and wet the back surface 41 of layer 11, and because it insures that all portion of moist layer 12 will be covered and will not be exposed and able to contact and wet the garment pocket in which folded apparatus 10 is stored. Bead 13 is important for a similar reason because bead 13 prevents the peripheral edge 15 of layer 12 from contacting a garment pocket and from "wicking" water from layer 12 to the garment pocket.

In use, layer 15 is moistened with water. Apparatus 10 is folded in half at least twice successively into a configuration in which each bead portion 13A to 13D (1) lies in a common arcuate plane, and (2) sealingly contacts an adjacent bead portion 13A to 13D to help prevent water from evaporating from layer 12. An adjacent pair of bead portions 13A to 13D sealingly contact one another as long as they contact one another along a substantial portion of their lengths (i.e. 50% or more of their lengths). Although desirable, it is not required that the bead portions stick or adhere to one another in order to be deemed to sealingly contact one another.

After apparatus 10 is folded, it is placed in a pocket, typically a pocket in a garment worn by a golfer. The golfer practices his putting, practices his chipping, practices his driving, or plays a round of golf. When desired, the golfer remove apparatus 10 from its pocket, unfolds the apparatus, places a golf ball adjacent and contacting layer 12, and manipulates the moistened pliable layer 12 over the ball to clean the ball. The golfer removes the ball, refolds pliable apparatus 10 to the configuration of FIG. 2, and places apparatus 10 in a pocket for storage and/or transport.

Having described my invention in such terms as to enable those skilled in the art to make and practice the invention, I claim:

1. A method for cleaning a golf ball, including the steps of
   (a) providing a panel laminate including
      (i) a first pliable water resistant layer having a peripheral edge,
      (ii) a second pliable water absorbent layer contiguous with said first layer and having a peripheral edge,
      (iii) a water resistant bead covering said peripheral edge of said water absorbent layer;
   said first and second layers being shaped and dimensioned such that said laminate is foldable into a reduced size which seals completely said second layer, which can be carried in the pocket of a garment worn by a user, and which prevents said second layer from contacting the pocket;
   (b) dampening said second layer with water;
   (c) folding said laminate into said reduced size;
   (d) when the user is at a first location, placing said laminate in the pocket;
   (e) when the user is at a second location, removing said laminate from the pocket, unfolding said laminate, and rubbing said dampened second layer over the golf ball to clean the golf ball.

2. A panel laminate for cleaning a golf ball, including
   (a) a first pliable water resistant layer having a peripheral edge;
   (b) a second pliable water absorbent layer contiguous with said first layer and having a peripheral edge co-terminating with said peripheral edge of said first pliable water resistant layer;
   (c) a water resistant bead covering said co-terminating peripheral edges; said first and second layers being shaped and dimensioned such that when said laminate is folded in half twice,
   said second water absorbent layer is sealed completely without in part contacting said first layer,
   said peripheral edges generally lie in a common plane, and
   said laminate is sized to be carried concealed in a garment pocket.

* * * * *